United States Patent [19]

Spencer

[11] Patent Number: 5,047,251

[45] Date of Patent: Sep. 10, 1991

[54] STABLE PEPPERMINT OIL HAVING REDUCED PULEGONE CONTENT AND METHOD OF PRODUCING THE SAME

[75] Inventor: Jeffrey S. Spencer, Kalamazoo, Mich.

[73] Assignee: A. M. Todd Company, Kalamazoo, Mich.

[21] Appl. No.: 349,580

[22] Filed: May 9, 1989

Related U.S. Application Data

[62] Division of Ser. No. 234,028, Aug. 18, 1988, Pat. No. 4,861,616.

[51] Int. Cl.[5] .......................... A23L 1/22; C11B 9/02

[52] U.S. Cl. ...................................... 426/3; 426/651; 514/783; 131/275

[58] Field of Search .................... 426/651, 3; 514/783; 131/275

[56] References Cited

U.S. PATENT DOCUMENTS 3,083,105 3/1963 Todd .................................. 426/651

*Primary Examiner*—Joseph Golian

*Attorney, Agent, or Firm*—Gordon W. Hueschen

[57] ABSTRACT

Crystal-clear peppermint oil maintaining its noble character and having a reduced pulegone content, enhanced menthone and menthol content, and improved stability against menthofuran oxidation breakdown is produced by a stereospecific method of reduction by hydrogenation of pulegone in situ using a saturated aqueous solution of sodium sulfite in the presence of glacial acetic acid at approximately neutral pH.

10 Claims, 1 Drawing Sheet

LEGEND

—+— CONTROL
---Δ--- REDUCED PEPPERMINT OIL
--⊖-- CONTROL
--+-- STARTING PEPPERMINT OIL

STABLE PEPPERMINT OIL HAVING REDUCED PULEGONE CONTENT AND METHOD OF PRODUCING THE SAME

This is a division of application Ser. No. 234,028, filed Aug. 18, 1988, now U.S. Pat. No. 4,861,616, issued Aug. 29, 1989.

FIELD OF THE INVENTION

Peppermint oil; peppermint oil having lower toxicity due to reduction of pulegone content and improved stability due to increased stability against menthofuran oxidation breakdown; stereospecific method for the reduction by hydrogenation of the pulegone content of peppermint oil without detracting from the desirable characteristics thereof.

BACKGROUND OF THE INVENTION

Pulegone, para-menth-4(8)ene-3-one, is a compound which occurs naturally in plants of the family Labiatae and essential oils obtained therefrom. Included within this family of plants is the genus Mentha and the species *piperita. Mentha piperita* is commonly known as peppermint. It contains pulegone at levels of approximately one to five percent in the essential oil obtained therefrom. Pulegone itself is an oily liquid having a boiling point of 224 degrees Centigrade and a specific gravity of 0.94. The toxicity of pulegone has been investigated and it has been found to have an $LD_{50}$ of 20 mg/kg of body weight per day. This is considered to be excessively toxic, so that legislation has been proposed to limit pulegone intake.

1) F. Grundschober, "Perfume." Flavorist 4, 15 (1979);
2) Thorup, et al., Toxicology Letters 19, pg 207-210 (1983);
3) EEC, Council de l'Europe, International Organization of the Flavour Industry Committee of Experts.

It would accordingly be highly desirable to eliminate or at least substantially reduce the pulegone content of peppermint oil but, of course, any such elimination or reduction would have to be effected without detracting from the desirable and noble characteristics of the peppermint oil itself. This is easier said than done. However, the present invention provides just such a solution to the problem using a sterospecific reduction by hydrogenation process which is not only productive of the desired reduction in pulegone content as well as an increase in the desirable components menthone and menthol, but also an additional unpredictable advantage of enhanced stability against breakdown of menthofuran by oxidation or the like, menthofuran also being a natural ingredient of peppermint oil which, in the small amounts in which present, contributes to the natural properties and characteristics of the oil itself, as do numerous other components thereof which are also present in limited amounts.

PRIOR ART

A search by STN International in the American Chemical Society, Chemical Abstracts Computer Base under the headings "Peppermint", "Pulegone", and combinations thereof through March of 1988 turned up only the following references of interest, which shed no light upon the problem of reducing pulegone content of peppermint oil without rendering the peppermint oil unsuitable for its usual commercial use. These references were as follows:

1) The Natural Variation of the Pulegone Content in Various Oils of Peppermint, by Farley and Howland, J. Sci. Food Agric. 31, 1143-1151 (1980);
2) Quantitative Determination of Minor Components in Essential Oils: Determination of Pulegone in Peppermint Oils, by Bicchi and Frattini, Journal of Chromatography 190, 471-474 (1980);
3) Short Term Toxicity Study in Rats Dosed with Pulegone and Menthol, by Thorup, et al., Toxicology Letters 19, 207-210 (1983);
4) Metabolism of Monoterpenes: Demonstration that (+)-cis-Isopulegone, not Piperitenone, is the Key Intermediate in the Conversion of (−)-Isopiperitenone to (+)-Pulegone in Peppermint (*Mentha piperita*), by Croteau and Venkatachalam, Archives of Biochemistry and Biophysics 249, No. 2, 306-315 (September 1986); and
5) Monoterpene Interconversions: Metabolism of Pulegone by a Cell-Free System From *Mentha Piperita,* by J. Battaile et al., Phytochemistry, 1968, Vol. 7, pp. 1159 to 1163, which reports a cell-free system study done primarily to identify the normal biosynthetic route of monoterpene interconversions in the peppermint plant itself;

copies of all of which references are provided herewith.

OBJECTS OF THE INVENTION

It is an object of the present invention to reduce the pulegone content of peppermint oil by a sterospecific method involving a reduction via hydrogenation of pulegone in situ in the peppermint oil without destruction of the desirable flavoring-agent characteristics and other advantageous properties of the peppermint oil itself. It is a further object of the invention to provides such a method which is simple, economical, and rapid and which does not result in the production of off-flavors due to undesirable side reactions which could render the peppermint oil a product unsuitable for commercial use. Further objects are to provide such a process involving the use of sodium sulfite in aqueous solution, in the presence of water which provides the necessary hydrogen ions for the hydrogenation reaction, at about a neutral pH, in the presence of acetic acid, preferably glacial acetic acid, and preferably with the addition of acid during the course of the reaction for purposes of maintaining the pH of the reaction, which would otherwise rise, at or about neutral. An additional important object of the invention is the provision of peppermint oil having a reduced pulegone content and which is therefore less toxic and which additionally possesses the desirable characteristic of improved stability against menthofuran oxidation breakdown as compared with the original of starting peppermint oil, so that the peppermint oil product of the invention is not only less toxic but also more stable and, in a preferred embodiment, moreover of improved color, being crystal clear in appearance, and characterized by increased menthone and menthol content when compared with the starting peppermint oil. Another object is the provision of peppermint oil flavoring compositions comprising an effective amount of the novel peppermint oil of the invention and a method of flavoring foods therewith. Other objects of the invention will become apparent hereinafter and still others will be obvious to one skilled in the art to which this invention pertains.

SUMMARY OF THE INVENTION

The invention, then, comprises the following aspects, inter alia:

A method for the reduction of the pulegone content in peppermint oil without detraction from the desirable flavoring-agent characteristics thereof which comprises the step of subjecting peppermint oil to a reduction process employing sodium sulfite in the presence of water supplying hydrogen ions for hydrogenation of the pulegone at a pH between about 6 and about 8; such a method wherein the reduction is conducted in the presence of acetic acid; such a method which is conducted using aqueous sodium sulfite and in the presence of glacial acetic acid; such a method wherein the aqueous sodium sulfite is a saturated solution of sodium sulfite; such a method wherein an excess of sodium sulfite over the theoretical is employed; such a method wherein approximately four times the theoretical amount of sodium sulfite is employed; such a method wherein the pH is maintained by the addition of glacial acetic acid during the course of the reaction; such a method wherein the pH is maintained at approximately neutral; such a method wherein the reaction is carried out at a reaction temperature at or near the boiling point of water; such a method wherein the reaction is carried out at reflux or with the employment of a looped system for return of water vapor to the reaction; such a method wherein, upon termination of the reaction, the peppermint oil is separated from the aqueous phase containing the remaining reactants and reaction products; such a method wherein the separated peppermint oil is steam-distilled; such a method wherein the peppermint oil contains less than about 0.5% pulegone, an increased menthone and menthol content, and is characterized by improved stability against menthofuran oxidation breakdown.

Moreover, peppermint oil characterized by the desirable flavoring-agent characteristics of natural peppermint oil but having diminished toxicity due to a pulegone content which is less than 0.5% by weight, and additionally characterized by increased stability to menthofuran oxidation breakdown; such a product which is crystal-clear in color and which maintains its noble peppermint oil character; such a product characterized by enhanced menthone content; and such a product characterized by enhanced menthone and menthol content.

Additionally, a peppermint oil composition for foods, chewing gum, confectionary, pharmaceuticals, beverages, tobacco and proprietary products which comprises an effective amount of the novel peppermint oil of the present invention, and a method of flavoring foods which comprises adding thereto an effective amount of the novel peppermint oil flavoring agent of the present invention.

DESCRIPTION OF THE DRAWING

A more complete understanding of the invention may be had by reference to the following detailed description of the invention when taken in conjunction with the accompanying drawing, wherein.

Figure 1:
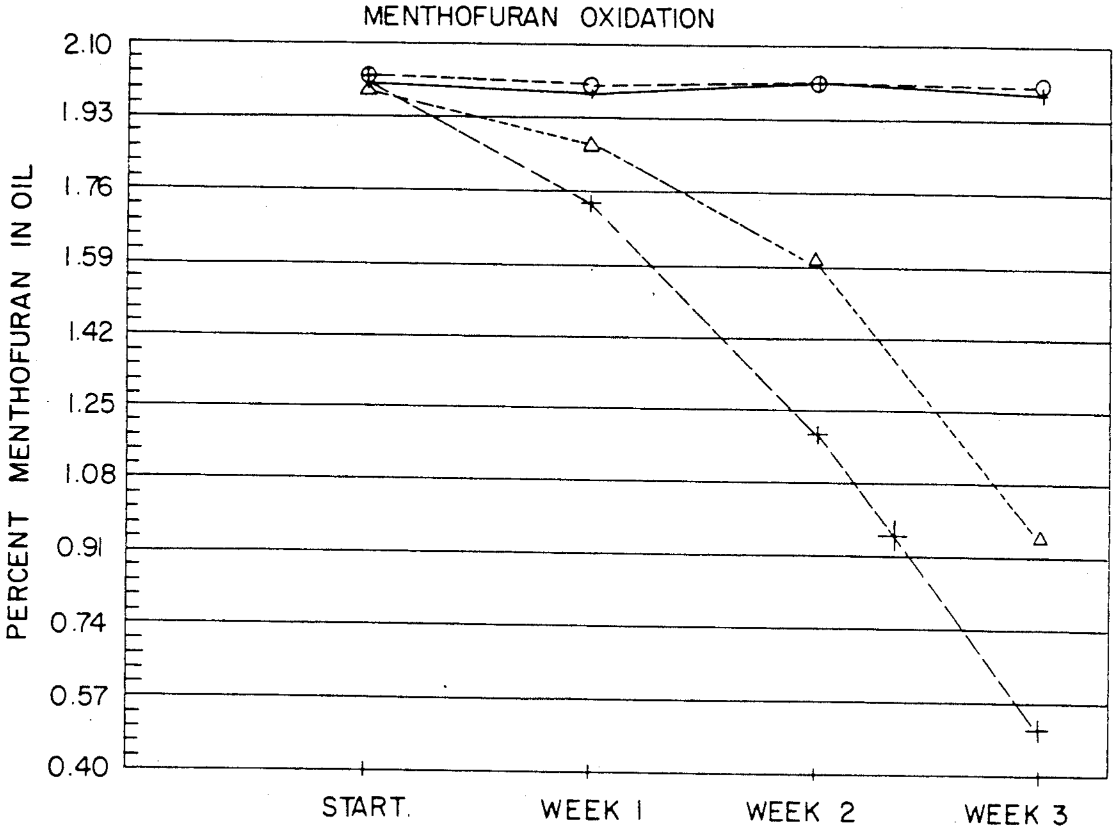
FIG. 1 is a graph showing the rate of menthofuran oxidation breakdown in the starting peppermint oil and in the peppermint oil product of the invention over time, the starting peppermint oil being referred to as such and the peppermint oil of the present invention being referred to as "reduced" peppermint oil.

In the control, the amount of menthofuran in the peppermint oil is essentially constant over a period of three (3) weeks whereas, in the starting peppermint oil the menthofuran oxidation breakdown and the rate of such breakdown is substantial. In the "reduced" peppermint oil of the invention, menthofuran oxidation breakdown also occurs, under the conditions of the test employed, but at a substantially decreased rate.

GENERAL CONSIDERATIONS

The theory behind the present invention is that the reduction of the monoterpene d-pulegone, naturally present in peppermint oil, would give rise to l-menthone and, upon further reduction, to l-menthol. The concept of the present invention was based upon this theory, which is the theoretical background of the present invention and the physical embodiments of the invention reported in this patent application. The method of the present invention continues more or less along the normal in vivo biosynthetic pathway which is theorized and speculated to occur in the plant itself (See Croteau et al., ibid., and references cited therein) involving a reduction by hydrogenation to reduce the amount of pulegone present in the oil but, at the same time, giving rise to l-menthone and, l-menthol, also natural and desirable components of peppermint oils to be used as flavoring agents. As an additional but not unfavorable side reaction of the present method, piperitenone (which Croteau says is not in the pathway) is also significantly reduced, but the essential terpenolene remains virtually unchanged, being indicative of the stereospecificity of the method of the present invention for oxygenated monoterpene compounds to the exclusion of any obvious or apparent attack upon the ring or the side chain of non-oxygenated compounds.

According to the method of the present invention, over a reaction period of approximately eight (8) hours, the pulegone level of a starting peppermint oil may be reduced by as much as ninety percent (90%) of its original value, but menthone does not show a corresponding reduction and, in fact, as shown in the following Examples, shows an increase in the amount of menthone over that present in the starting peppermint oil, as does menthol as well, again exemplifying the selectivity of the method of the invention to pulegone and to a lesser extent piperitenone.

When employing the procedure of the present invention, essential oils extracted from *Mentha piperita* grown in any suitable geographic area can readily be converted to peppermint oil having a reduced pulegone level. This is effected according to the method of the present invention by reduction via hydrogenation using an aqueous sodium sulfite solution, preferably such a saturated solution, in the presence of acetic acid, preferably glacial acetic acid, since, when water is present, reactions occur with the acid and a product with off notes and discoloration may result. An aqueous solvent is required to serve as a source of hydrogen ions to cooperate with the sodium ion, provided by the sulfite, for achievement of the desired reduction via hydrogenation. The acid is added to maintain the pH of the solution at or slightly below 7, that is, preferably as close to neutral as possible, with the broader range of about 6 to about 8 being generally satisfactory, the pH of the reaction rising during the course of the reaction. A liberated supply of hydrogen ions is needed for the hydrogenation to occur throughout the reduction procedure, but one of the by-products of the reaction is sodium hydroxide, the evolution of which causes the pH of the reaction to continually increase, that is, the reaction becomes more basic. When relatively high pulegone levels are present in the starting peppermint oil, additional acetic acid is preferably added during the course of the reaction to ensure an adequate reduction and an adequate maintenance of the pH at about neutral. It is to be observed that the solution should not be rendered too acidic since excess acidity may affect the quality of the oil and, as is well known, at lower pHs a reduction in the amount of sabinene hydrate, a naturally-occurring component of peppermint oil sometimes employed as a quality indicator, may occur.

In general, the reaction is carried out in any suitable reaction vessel which is equipped with stirring apparatus for vigorous stirring of the contents during the reaction to maximize contact between the starting peppermint oil and the other reactants. Reflux is preferably maintained throughout the entire reaction period and this is conveniently effected by means of a reflux condensor or a closed-loop system which will return the water in the vapor phase to the liquid phase of the reaction. The closed loop system is very convenient for plant operation and is effective to maintain the temperature at about 99° to 100° C. Upon completion of the reaction, the aqueous phase is separated from the oil phase in any convenient manner, e.g., a separatory funnel may be employed. Due to the favorable solubility coefficients of the reactants, all chemical reactants are in solution in the water phase and therefore may be conveniently separated from the peppermint oil phase. A final steam distillation of the resulting oil is preferably carried out to remove any trace contaminants and/or off notes which might be present, and the result of the procedure, as more fully detailed in and illustrated by the following Examples, is a highly-stable, crystal-clear oil of peppermint with low pulegone levels, increased menthone and menthol levels when compared with the starting peppermint oil, and an improved stability to menthofuran oxidation breakdown.

The theoretical amount of sodium sulfite required is shown by the following equation:

$$((W \times 3P1 \times \text{factor } 1)+(W \times 2P2 \times \text{factor } 2))/100$$

Wherein:

W = weight of oil to be treated(gms)

P1 = % piperitenone in starting oil

P2 = % pulegone in starting oil

F1 = (Mol W $Na_2SO_3$)/(Mol W Piperitenone) = 0.839

F2 (Mol W $Na_2SO_3$)/(Mol W Pulegone) = 0.827

However, because the sodium sulfite is not soluble in oil and must come into contact with the pulegone via an aqueous media, an excess over, preferably even four (4) times the theoretical amount of sodium sulfite, is recommended for a reasonable reaction time at reasonably efficient and economic temperatures, e.g., at or about the boiling point of water, with reflux or $H_2O$-return being preferred.

The minimum amount of water needed for the preferred amount of sodium sulfite to go into solution, that is, to produce a saturated solution, can be calculated as shown in the following:

$$(WS/34.7) \times 100 \text{ ml}$$

Wherein:

WS = Weight of sodium sulfite to be used 34.7 = Solubility coefficient for sodium sulfite The amount of acid to be added should preferably be monitored by checking the pH and maintaining it as close to neutral as possible throughout the entire procedure, a pH range of about 6 to about 8 being necessary for acceptable operational efficiency.

Other reducing agents were also tried, such as sodium borohydride and lithium aluminum hydride, but they were found to be too non-specific and resulted in an oil which was totally unacceptable in quality. Hydrogen plus a metallic catalyst is not only uneconomical but also hazardous. Moreover, if charcoal is present, as in palladium on charcoal catalysis, it will absorb sesquiterpenes which changes product flavor considerably. Solvents other than water were also examined from the standpoint of serving as a reaction medium. These included solvents such as methyl and ethyl alcohol, but solvents of this nature resulted in relatively poor quality products which were difficult to separate from those organic solvents, which are soluble in the oil. Because there are no inherent advantages with a solvent other than water, and sodium sulfite shows the desired selectivity for reduction of pulegone levels, it is a reasonable conclusion that the method of the present invention affords an excellent and unparalleled procedure for obtaining a high quality, low pulegone, highly-stable essential oil of *Mentha piperita.*

DETAILED DESCRIPTION OF THE INVENTION

The following examples are given to illustrate the method and product of the present invention, but are not to be construed as limiting:

Quantitation of pulegone

Pulegone levels, along with other constituent levels, were monitored throughout the reaction period via Gas Liquid Chromatography(GLC). The analyses were performed on a Varian Model 6000 (TM) GLC equipped with a flame-ionization detector, a 60-meter fused silica Supercowax 10 (TM), 0.25 mm ID., 0.25 μm film capillary column. The GLC run was programmed at 75° C. for 8 min. to 200° C. at 4° C./min. and a 25 min. upper hold time at 200° C. Comparative quantitation was done on a weight percent and peak count basis.

Reagents Employed $Na_2SO_3$ (Baker Analyzed-Seargent Welch)

$H_2O$

Glacial Acetic Acid (Seargent Welch)

The amount and time period of reagents and reaction, respectively, varies according to initial pulegone levels, and the desired level of pulegone at completion. The reaction behaves according to first degree kinetics, and thus is both reagent and compound concentration dependent.

EXAMPLE I

Reduction of Pulegone in situ; aqueous sodium sulfite solution (not saturated)

In a large reaction flask, add 900 ml $H_2O$, 180 gms sodium sulfite, 40 ml glacial acetic acid, and stir. To the solution of reagents, add 900 gms of peppermint oil (A. M. Todd Company, Kalamazoo, Mich., U.S.A. lot number 3322, from Willamette Valley, Ore.) and maintain at reflux (100° C.) for 8 hours. Separate oil and water phases and steam distill resulting oil. Under above conditions, a final pulegone level of 0.34% was obtained, whereas the control (starting) oil had a pulegone level of 2.35%. This is a reduction of 86 percent. The resulting oil was also crystal clear as compared to the control which maintained a slight natural yellow off color even after steam distillation.

EXAMPLE II

Employment of Saturated $Na_2SO_3/H_2O$ Solution and Acetic Acid Addition During the Reaction In a large reaction flask—320 ml $H_2O$, 112 gms $Na_2SO_3$ and 30 ml glacial acetic acid were added to form a saturated solution. To this, 900 gms of peppermint oil (A. M. Todd Company, Kalamazoo, Mich., U.S.A. lot number 3376 from Kennewick, Yakima Valley, Wash.) were added. This mixture was stirred vigorously under reflux (100° C.) for a period of 6 hours, at which point the pH was checked and found to be approximately 8.5. Because of the increased basicity of the mixture, an additional 10 ml of acetic acid was added bringing the pH closer to neutral. The reaction mixture was stirred for an additional hour and the resulting oil was separated from the aqueous phase and then steam distilled. A final pulegone level of 0.41%, as compared to 1.20% in the starting oil, was achieved. The resulting oil was crystal clear and of high quality.

| | Menthone and Menthol Analyses, % by Weight | | | |
|---|---|---|---|---|
| Example | Starting Menthone | Ending Menthone | Starting Menthol | Ending Menthol |
| 1 | 17.520 | 18.034 | 40.772 | 42.683 |
| 2 | 21.958 | 23.004 | 38.131 | 39.644 |

Studies show the peppermint oil obtained from the procedure of the present invention to be 40-50% more stable to menthofuran oxidation breakdown than the starting peppermint oil. Menthofuran is a normal component of peppermint oil, the oxidative breakdown of which occurs due to aging and exposure to ultraviolet-light, with the resulting production of off-quality flavors.

Essentially the same results are obtained when operating according to the present invention regardless of the source of the starting peppermint oil which, in the foregoing, came from Willamette Valley, Ore., and Kennewick, Yakima Valley, Wash. Other sources in Washington and Oregon, such as Madras, Ore. and additional geographic sources of peppermint oil such as Idaho, Wisconsin, Indiana, and Michigan, are equally satisfactory. Although the geographical peppermint oils have typical corresponding compositions, the components of which vary within known limits and ratios, when treated according to the present invention they all produce equally satisfactory results and equally satisfactory end products, in which the pulegone content is reduced, the menthone and menthol content is increased compared with the starting peppermint oil, and the rate of menthofuran oxidation breakdown is decreased when compared with the same phenomenon in the starting peppermint oil under the identical conditions of the test employed involving accelerated aging by exposure to elevated temperatures and ultra-violet light.

RESULTS AND DISCUSSION

As already stated, menthofuran oxidation studies were performed on the treated oil product, and a representative control. The treated oil was much more stable than the control and resulted in a menthofuran breakdown rate which, by difference in slope of the curves, was 40-50% slower than the control, depending upon length of time elapsed, as shown in FIG. 1. The effective shelf life of the peppermint oil product and items flavored therewith is accordingly increased.

The improved peppermint oil of the invention may be stored or used directly as a flavoring agent, with or without formulation into flavoring compositions by diluting with water or other usual flavor composition ingredients, by blending into foods, chewing gum, confectionary, pharmaceuticals, beverages, tobacco and proprietary products such as toothpaste and mouthwash by conventional means in amounts sufficient to provide the desired flavoring power. Acceptable amounts will vary from about 0.01% to about 5.0% by weight flavoring agent based on the weight of the final product.

It is therefore seen that the present invention provides novel peppermint oil having excellent flavor and visual characteristics, although of reduced toxicity because of considerably reduced pulegone content, as well as enhanced menthone and menthol content and increased stability by virtue of reduced tendency toward menthofuran oxidation breakdown with its attendant off-flavors, and an extremely valuable and stereoselective process for the reduction of pulegone levels in situ therein without detracting from the desirable properties or qualities of the starting peppermint oil, all having the unpredictable and highly advantageous characteristics and effects as more fully set forth in the foregoing, and whereby all of the objectives of the present invention are attained.

It is to be understood that the invention is not to be limited to the exact details of operation, or to the exact compositions, methods, procedures, or embodiments shown and described, as obvious modifications and equivalents will be apparent to one skilled in the art, and the invention is therefore to be limited only by the full scope which can be legally accorded to the appended claims.

I claim:

1. Peppermint oil characterized by a menthofuran content and a pulegone content which is less than 0.5% by weight, and additionally characterized by improved stability against menthofuran oxidation breakdown compared to peppermint oil having a higher pulegone content and also characterized by having increased methone and menthol levels when compared with a peppermint oil having a higher pulegone content.

2. Product of claim 1, which is crystal-clear in color.

3. Product of claim 1, characterized by menthone content greater than 18% by weight.

4. Product of claim 1, characterized by menthone and menthol content greater than 60% by weight.

5. A peppermint oil composition useful for flavoring foods, chewing gum, confectionary, pharmaceuticals, beverages, tobacco and proprietary products, which comprises an effective flavoring amount of the peppermint oil of claim 1 together with an edible diluent.

6. A peppermint oil composition, useful for flavoring foods, chewing gum, confectionary, pharmaceuticals, beverages, tobacco and proprietary products, which comprises an effective flavoring amount of the peppermint oil of claim 3 together with an edible diluent.

7. A peppermint oil composition, useful for flavoring foods, chewing gum, confectionary, pharmaceuticals, beverages, tobacco and proprietary products, which comprises an effective flavoring amount of the peppermint oil of claim 4 together with an edible diluent.

8. A food, chewing gum, confectionery, pharmaceutical, beverage, tobacco, or proprietary product flavored with an effective flavoring amount of the peppermint oil of claim 1.

9. A food, chewing gum, confectionery, pharmaceutical, beverage, tobacco, or proprietary product flavored with an effective flavoring amount of the peppermint oil of claim 3.

10. A food, chewing gum, confectionery, pharmaceutical, beverage, tobacco, or proprietary product flavored with an effective flavoring amount of the peppermint oil of claim 4.

* * * * *